United States Patent [19]

Huggett et al.

[11] 4,087,920
[45] May 9, 1978

[54] TWO-FLUID TILTMETER

[75] Inventors: George R. Huggett, Mercer Island, Wash.; Larry E. Slater, Hollister, Calif.

[73] Assignee: The United States of America as represented by the Secretary of the Interior, Washington, D.C.

[21] Appl. No.: 781,272

[22] Filed: Mar. 25, 1977

[51] Int. Cl.$^2$ .................... G01C 5/04; G01C 9/22
[52] U.S. Cl. ............................................ 33/367
[58] Field of Search .......................... 33/367, 377

[56] References Cited

U.S. PATENT DOCUMENTS

| 3,269,023 | 8/1966 | Calkins | 33/367 X |
| 4,026,156 | 5/1977 | Bowditch et al. | 33/367 X |

FOREIGN PATENT DOCUMENTS

| 265,472 | 5/1970 | U.S.S.R. | 33/367 |

OTHER PUBLICATIONS

"Precision Leveling with a Two-Fluid Tiltmeter"; Huggett et al.; Geophysical Research Letters; pp. 754-756, 12/1976.

*Primary Examiner*—Charles E. Phillips
*Attorney, Agent, or Firm*—Thomas Zack; Donald A. Gardiner

[57] ABSTRACT

A tiltmeter which uses two fluids of different thermal density coefficients, each of which is contained in its own fluid system consisting of a long tube connecting two vertical reservoirs. The two systems are deployed in physical contact along their entire length so that they experience the same thermal conditions. Measurements with this instrument are made by taking separate, simultaneous readings of the difference in fluid heights and/or bottom fluid pressure between the terminal vertical reservoirs in each of the two fluid systems; these measurements, together with known density coefficients of the fluids, provide the data to correct for errors in meter readings caused by temperature/density fluctuations in the fluids and permit a precise determination of vertical displacement and tilt over the measurement path. The ruggedness and unique design of this tiltmeter allow it to make more accurate measurements of regional tilt than previous tiltmeters and with less expenditure of money and effort.

12 Claims, 3 Drawing Figures

TWO-FLUID TILTMETER

BACKGROUND OF THE INVENTION

1. Field of the Invention

Our invention is a type of instrument known as a two-fluid tiltmeter, which is used to measure relative vertical displacement between the ends of a known baseline. From this measurement, regional tilt may be inferred or determined. The benefits of accurately determining regional surface tilting with our instrument are many and include, but are not limited to, the following: to assist in predicting earthquakes; to measure surface uplift and subsidence from geophysical forces (volcanoes, geothermal fields) and industrial activity (mining, petroleum and ground water pumping); to monitor the stability of salt domes that could be used for storage of oil or radioactive waste; and to determine the degree of tilting in areas where sensitive instruments that require stable bases are being used (i.e., astronomical observatory, lunar laser ranging observatory).

2. Description of the Prior Art

At the present time, vertical displacement is generally determined by using gravity meters, precision levels (spirit levels and/or bubble tiltmeters), and single-fluid tiltmeters. The use of a gravity meter to infer vertical displacement assumes that the material beneath the instrument has a constant density; this may be a poor assumption, particularly in an active volcanic region. The use of spirit levels is subject to many systematic errors, and great care and expense is required to measure vertical displacements over kilometer-long baselines to a precision approaching a millimeter (inferred average tilt of a microradian). The use of bubble tiltmeters, which are short baseline instruments, is significantly limited by their great sensitivity to surface conditions near the piers.

Many of the problems associated with gravity meters, spirit levels, and bubble tiltmenters are overcome by using a medium-length baseline single-fluid tiltmeter, which consists of a horizontal tube connecting two vertical reservoirs mounted on separated piers. A major advantage of this type of prior art system is that localized tilting at the piers produces only second order errors in regional tilt determinations. There are, however, major disadvantages in using this system. Errors in meter readings occur when using baselines of considerable length (over 10 meters) because of variations in the fluid's density caused by temperature fluctuations along the measurement path. To reduce these errors, it is usually necessary to resort to the impractical expedient of deploying the tiltmeter in a horizontal position and burying it.

Our invention is designed to resolve these problems associated with the single-fluid tiltmeter. As explained hereafter, our two-fluid tiltmeter may be used over long baselines (i.e., 1 kilometer) without burial or precise horizontal deployment and provides the data necessary to correct for thermally induced errors.

SUMMARY OF THE INVENTION

This invention is an improved fluid tiltmeter and a method of using it to obtain precise measurements of vertical displacement and tilt. The apparatus of this invention employs two adjacent fluid systems in thermal contact along the entire measurement path. Each system consists of a long tube linking separate vertical reservoirs located on terminal piers. The span between the piers is the region over which vertical displacement is to be measured and the tilt determined.

The method of determining vertical displacement is based upon using two fluids of different thermal density coefficients with each system utilizing a different fluid. Devices are provided to make separate, simultaneous measurements of the difference in fluid heights and/or bottom fluid pressure between the terminal reservoirs in each of the two systems. These measurements provide the necessary data to correct for density changes in the fluids and permit a precise determination of vertical displacement and tilt in the measurement path.

BRIEF DESCRIPTION OF THE DRAWINGS

FIG. 1 schematically illustrates the apparatus of the preferred embodiment of the invention. It employs two mechanically identical systems designated as System 1 and System 2. Both systems are in thermal and physical contact along their entire lengths. Each system consists of a long tube linking separate vertical fluid reservoirs located on terminal piers 3 and 4. For System 1, the reservoirs are labeled 5 and 6, and the interconnecting conduit is flexible tube 7. For System 2, the reservoirs are 8 and 9, and the interconnecting conduit is flexible tube 10.

Figure 1:
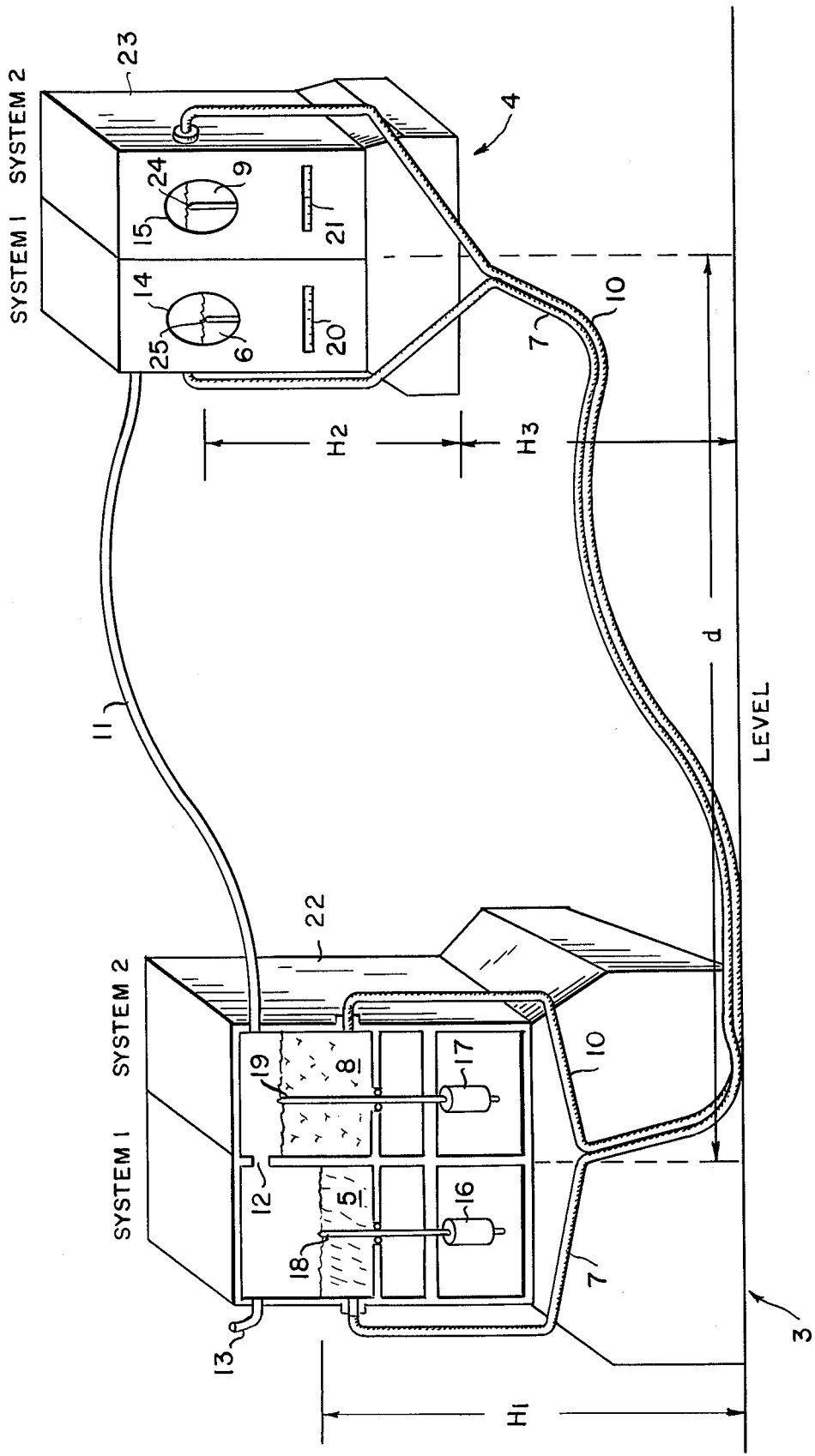
FIG. 1 is a schematic view of the preferred embodiment of the apparatus used in operating our invention.

In order to insure equal atmospheric pressure over the fluids in all four reservoirs, an air line 11 is provided to connect the upper portions of both systems; and at each pier there is an aperature 12 joining the air chambers over the fluids. A vent to the atmosphere 13 is placed in the reservoir wall above the fluids at one of the piers. The front of the housing 22 of the two systems in the left hand pier of FIG. 1 has been illustrated as transparent to show the internal system workings including the reservoirs, apertures, and vent. Housings 22 and 23 are, except for their vents to the ambient atmosphere and interconnecting fluid conduits, sealed from their immediate outside environment.

System 1 contains a fluid that has a different known thermal density coefficient than the fluid contained in System 2. For example, two fluids we have used are methyl alcohol and ethylene glycol. Other fluids may be used as well, but care must be taken to choose two fluids having densities that vary linearly with temperature in order to obtain the necessary comparison measurements to correct for thermally induced errors.

One of the measurement techniques used to determine vertical displacement and thermally induced errors requires that two separate, simultaneous fluid height measurements be made. The first is a measurement of the difference in fluid heights between the two reservoirs of System 1, and the second is a measurement of the fluid height differences between the reservoirs in System 2. The height measurement can be accomplished in many ways by those knowledgeable in the art, including the use of micrometers, optical sensors, differential transducers, and capacitive coupling. In the schematic embodiment shown in FIG. 1, the measurements are made by observing the fluid levels in each reservoir through the view ports 14 and 15, and measuring the heights of the fluids at their mensicus with precision micrometers 16 and 18. For example, typical of such micrometers are model 251 manufactured by Mitutoyo. The micrometer points 17 and 19 are moved to the heights of the fluids at their mensicus, and readings are taken from the rotatable micrometer dials 20 and 21. From these readings, the fluid height differences are calculated and used to correct for density fluctuations and to determine relative vertical displacement over the measurement path. Either a magnifying lense or small telescope may be used to take these fluid height measurements.

The basic mathematical expressions and derivations that are used to correct for error and determine displacement are presented in a paper by G. R. Huggett, L. E. Slater, and G. Pavlis entitled "Precision Leveling with a Two-Fluid Tiltmeter," *Geophysical Research Letters*, 3 (12): 754–56, December 1976. Therein it was shown that when the densities of the two fluids vary linearly with temperature, the relative difference in height between the two piers $H_3$ (see FIG. 1), may be expressed by the following formula:

$$H_3 = \Delta_a - \frac{\alpha_a}{\alpha_b - \alpha_a}(\Delta_b - \Delta_a) \quad (1)$$

where $\Delta_a$ is the difference in fluid heights between the reservoirs of System 1; $\Delta_b$ is the difference between the fluid heights of the reserviors in System 2; and $\alpha_b$ is the thermal density coefficent in the fluid in System 1; and $\Delta_b$ is the thermal density coefficient of the fluid in System 2. With this method and apparatus described above, a determination of vertical displacement with a resolution of $10^{-8}$ to $10^{-9}$ is realistically possible.

Figure 3:
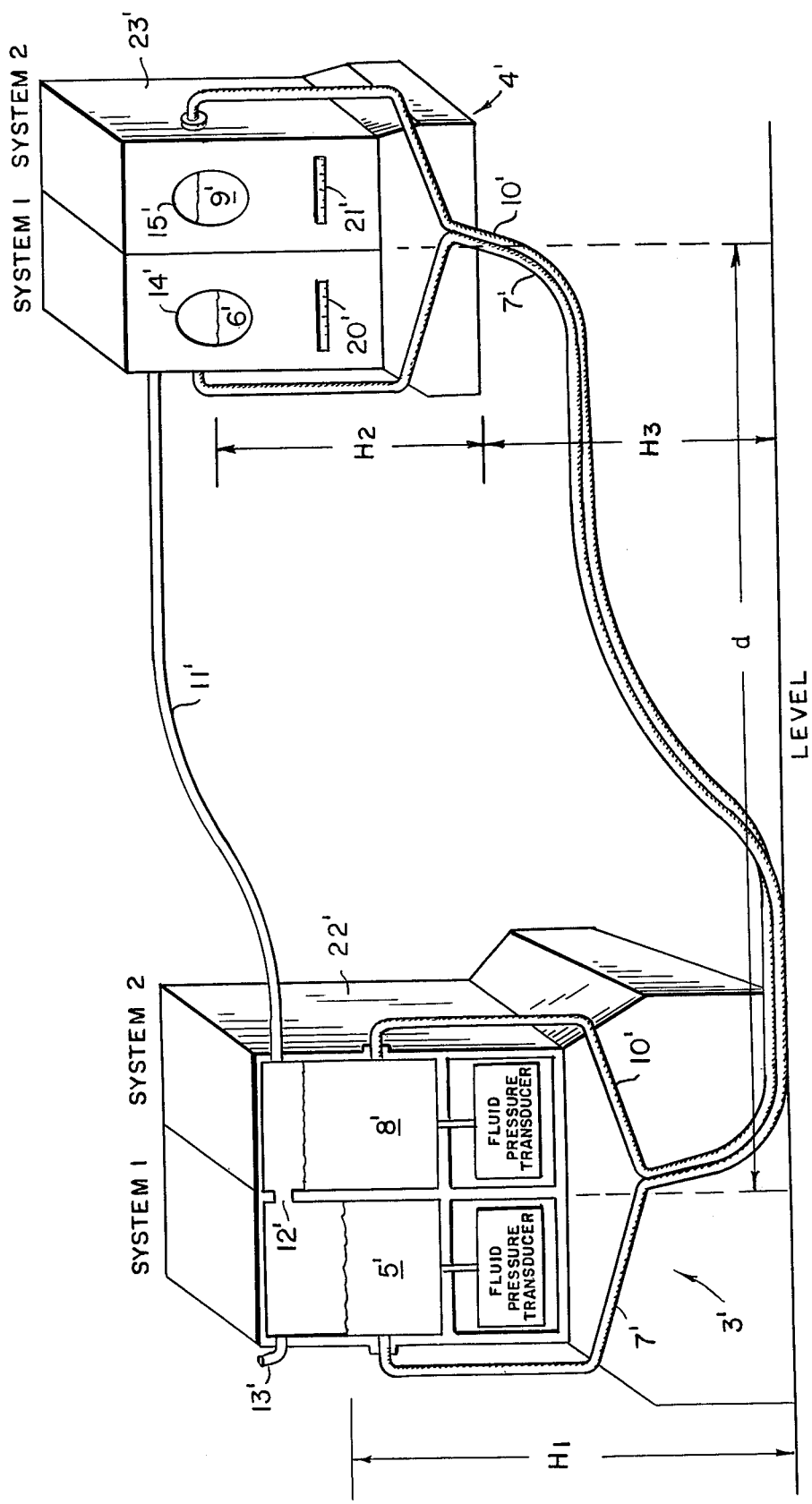
FIG. 3 is a modification of the FIG. 1 embodiment employing a different measurement technique.

A second measurement technique to determine thermal errors and vertical displacement, which uses basically the same apparatus, may also be employed. FIG. 3 depicts how this would be set up. For simplicity purposes, primes have been added to the same common elements used in the FIG. 1 embodiment. The essential difference between the FIG. 1 and FIG. 3 embodiments is in the measuring devices. In FIG. 3, a pressure tranducer is used to measure the fluid pressure on the bottom of the four fluid reservoirs. This reading is displayed at the readouts 20' and 21'. An example of the type of pressure transducer which could be used is Model 215 A 15 psi, Absolute manufactured by Paroscientific, Inc. of Redmund, Wa. 98052. In place of measuring fluid height differences between the terminal reservoirs as in FIG. 1, measurements are made of the difference between fluid pressure readings taken at the bottom of the reservoirs in each system. Using pressure measurements, the relative difference in height between the two piers $H_3$ (see FIG. 1) may be expressed by the following formula:

$$H_3 = \frac{\Delta P_a}{g\rho_{ao}} - \frac{\Delta_a}{\alpha_b \alpha_a} \left( \frac{\Delta P_b}{g\rho_{bo}} - \frac{\Delta P_a}{g\rho_{ao}} \right) \quad (2)$$

where $\Delta P_a$ is the difference between fluid pressure measurements at the bottoms of the two reservoirs in System 1; $\Delta P_a$ is the difference between fluid pressure measurements at the bottoms of the two reservoirs in System 2; $\rho_{ao}$ is the density of the fluid in System 1 at a reference temperature; $\rho_{bo}$ is the density of the fluid in System 2 at the reference temperature; and $g$ is the acceleration of gravity which is assumed uniform.

The tilt angle in radians for both embodiments is determined from the relationship:

$$\text{Tilt angle} = \frac{H_3}{d} \quad (3)$$

where "$d$" is the horizontal distance between the centers of th reservoirs as shown. Our goal is to achieve a 1 micron resolution measurement for the $H_1$ or $H_2$ height distances when the horizontal distance "$d$" is 1 kilometer. Typically, these distances for "$d$" would be between 100 meters to 1 kilometer.

Figure 2:
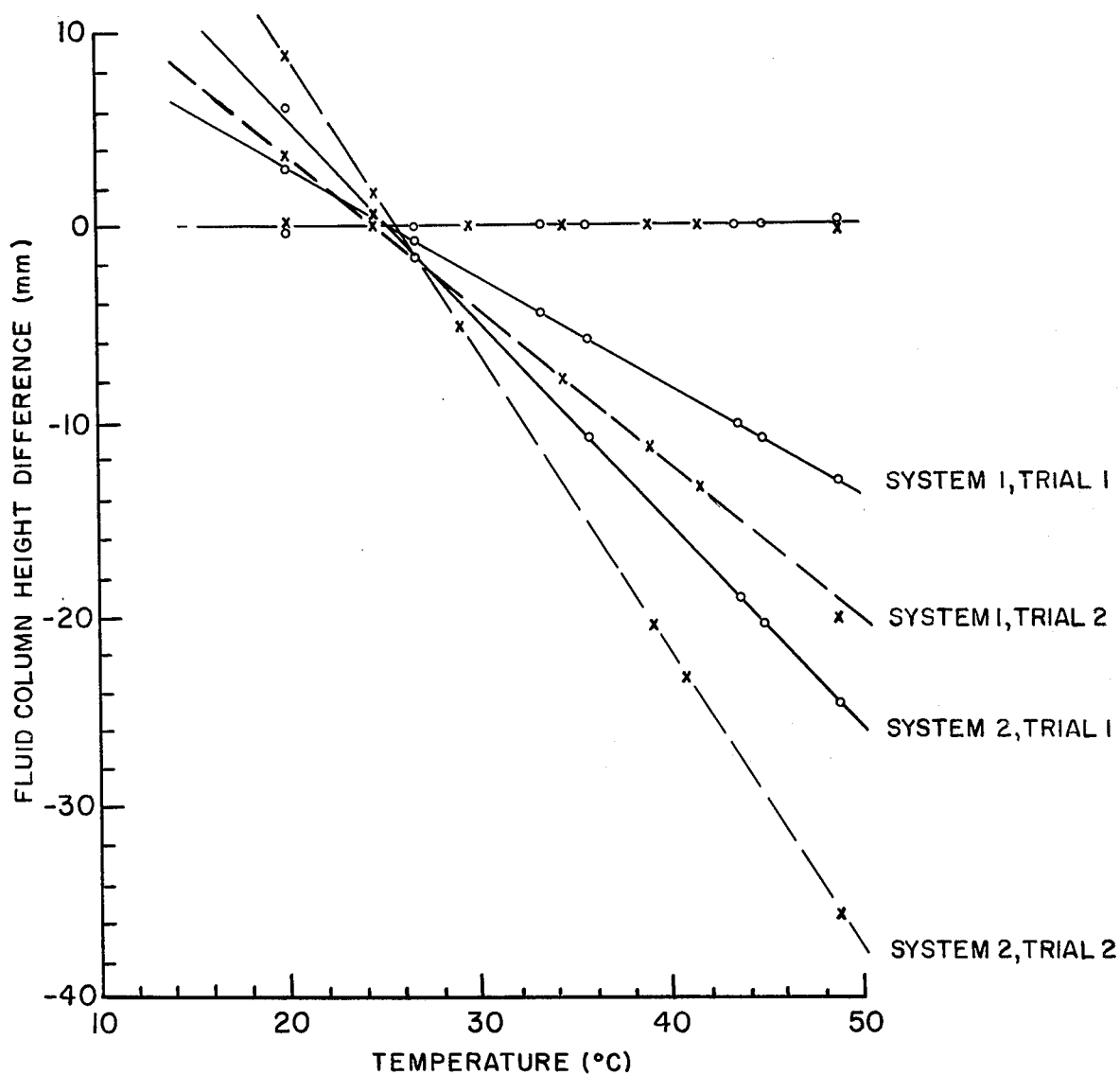
FIG. 2 is a typical graph showing experimental test results employing our invention.

FIG. 2 shows experimental test data that verifies the usefulness of our two-fluid tiltmeter concept. In our experimental arrangement, the two pairs of reservoirs were placed side by side on a common stand where fluid height measurements were taken. Identical portions of the connecting tubes were encased in a water jacket wherein the tubes, and the fluids they contained, were subjected to temperature variations between 20° C and 49° C. In the first trial, one end of the water jacket was raised 1 meter above ground level, and in the second trial, the end was raised to slightly less than 2 meters above ground level. Thus, under these arrangements, any differential changes in liquid levels were not due to actual vertical displacement but rather to simulated thermal and surface conditions that might exist in the field. Therefore, the corrected relative elevation difference should always be zero.

In FIG. 2, the horizontal line showing the corrected difference in fluid heights for the two trials does in fact indicate corrected figures close to zero. The corrected data have a standard deviation from the mean of 0.13mm. Because all of the data were taken by visually sighting the mensicus of the fluids against a machinist's scale, this value could easily be improved with automatic level recording. The graph also shows a pair of dashed lines and a pair of solid lines. The solid lines show thermally induced errors in methanol (System 1) and glycol (System 2) in the first trial. The dashed lines show thermally induced errors in System 1 and System 2 in the second trial.

Although our invention has been described with respect to a specific preferred working embodiment and a modification thereto, it is apparent that other variations may be made in the types of fluids used, measuring devices, and/or components. None of these specifically disclosed features should be used to limit the scope and spirit of our invention which is to be measured only by the claims which follow.

We claim:

1. A two-fluid tiltmeter having two substantially identical adjacent systems exposed to the same thermal conditions, each of said systems containing a fluid with thermal density coefficients that are different from the other system and each system comprising:
    two generally vertical fluid reservoirs which are separated from each so that each is located at a terminal pier;
    interconnecting means for providing fluid communication between the reservoirs at their separated piers; and
    means for measuring the differences in specific measurable fluid parameters between the fluid in the two reservoirs of the same system.

2. The two fluid-tiltmeter of claim 1 wherein each system is exposed to the same thermal conditions of the other system by deploying their respective reservoirs and fluid interconnecting means in physical contact along their entire lengths.

3. The two-fluid tiltmeter of claim 2 wherein each of said interconnecting means for providing fluid communication between the reservoirs is a flexible elongated fluid tight connecting tube.

4. The two-fluid tiltmeter of claim 1 wherein said means for measuring provides means for the simultaneous measurements of the fluid height differences between the fluids of the same system in their separated reservoirs.

5. The two-fluid tiltmeter of claim 1 wherein said means for measuring provides means for the simultaneous measurement of the bottom fluid pressure in the separated reservoirs of each system.

6. The two-fluid tiltmeter of claim 1 also including means for providing exposure to equal atmospheric pressure over the fluids in each reservoir.

7. The tiltmeter of claim 6 wherein said means for providing equal atmospheric pressure comprises a conduit system connecting the upper portions of each reservoir above their fluid levels with each other and the ambient gas whereby they are in gaseous communication therewith.

8. The tiltmeter of claim 7 wherein said means for measuring the difference in fluid parameters comprises vertically movable micrometers in each reservoir to measure the mensicus of the fluids in their reservoirs.

9. A two-fluid tiltmeter method for determining vertical displacement between two surface locations separated by a known baseline distance comprising the steps of:
(a) measuring the vertical heights of a first system of fluid reservoirs connected by a fluid conduit wherein each of said reservoirs has a fluid of a known thermal density coefficient and is located at one of the surface locations;
(b) measuring the vertical heights of a second system of fluid reservoirs subjected to the same thermal conditions as the first system, each of the fluid reservoirs of said second system having a fluid of a known thermal density coefficient different from the first system and being connected by a fluid conduit, each reservoir of the second system being located at one of the surface locations; and
(c) determining the vertical displacement between said two locations based upon the difference in vertical heights of reservoirs in the two systems and the different thermal density coefficients.

10. The two-fluid tiltmeter method of claim 9 wherein the vertical height measurements of step (a) occur simultaneously and the vertical height measurements of step (b) occur simultaneously.

11. The two-fluid tiltmeter method of claim 10 wherein the difference in vertical heights is used to determine the tilt angle between locations.

12. A two-tiltmeter method for determining vertical displacements between two surface locations separated by a known base-line distance comprising the steps of:
(a) measuring the fluid pressure of a first fluid with a known density at the bottoms of two reservoirs of a first system wherein each reservoir is located at one of the surface locations and is in fluid communication with the other;
(b) measuring the fluid pressure of a second fluid with a known density at the bottom of two reservoirs of a second system subject to the same thermal conditions as the first system wherein each reservoir of the second system is located at one of the surface locations and is in fluid communication with other reservoir, and
(c) determining the difference in height between the two locations based upon the measurements of steps (a) and (b).

* * * * *